Patented Aug. 8, 1950

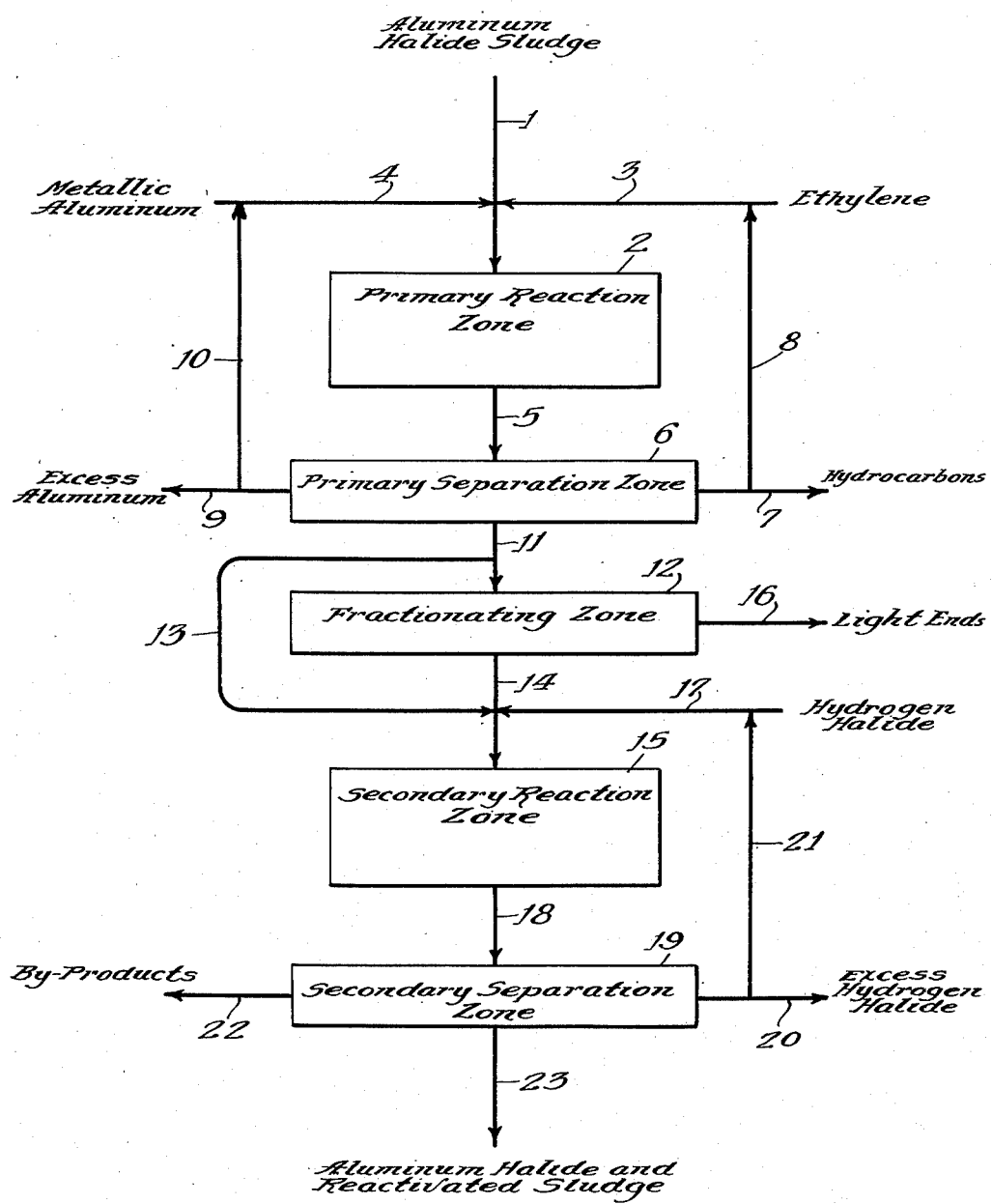

2,517,692

UNITED STATES PATENT OFFICE 2,517,692

REGENERATION OF ALUMINUM HALIDE SLUDGES

Julian M. Mavity, Hinsdale, Ill., assignor to Universal Oil Products Company, Chicago, Ill., a corporation of Delaware Application December 20, 1945, Serial No. 636,225

8 Claims. (Cl. 23—96)

The present invention relates to a method of regenerating deactivated aluminum halide catalysts by contacting said deactivated aluminum halide with reactive components to form a complex reaction product, and subsequently treating the product thereof with an anhydrous hydrogen halide. The invention concerns in a more specific application the reactivation of aluminum halide catalysts which appear in the sludges formed during various hydrocarbon conversion processes in which said aluminum halide is utilized as a caatalyst. Said reactivation is accomplished by a series of distinct chemical treatment steps and specific handling procedures as hereinafter described and set forth.

In the operation of certain hydrocarbon conversion reactions in which aluminum halides (particularly anhydrous aluminum chloride and aluminum bromide) are utilized as the conversion catalysts, the aluminum halide originally charged is gradually converted into a so-called "sludge" which appears in the reaction zone as an insoluble viscous liquid or semi-solid reaction product separating from the reactants and settling to the bottom of the reactor as a lower layer. Hydrocarbon conversion reactions utilizing said aluminum halides as catalysts represent typical processes in which such sludges are formed as, for example, hydrocarbon isomerization, alkylation, polymerization, and cracking reactions wherein the hydrocarbon reactants such as olefinic, paraffinic, and/or aromatic hydrocarbons are contacted with the catalyst to form in part a converted hydrocarbon product and in part the herein referred to sludge. The sludge as separated from the reaction mixture may or may not be accompanied by tars and/or polymeric reaction products, depending upon the temperature employed in the conversion reaction, the presence of a hydrogen halide during the conversion, the stability of the individual hydrocarbons contained in the charging stock and the period of contact between the aluminum halide and the hydrocarbons during the reaction. Coke-like materials, for example, may be formed during cracking operations utilizing aluminum halide catalysts at the relatively high temperatures required to effect hydrocarbon cracking reactions, while in polymerization reactions, tar-like or polymeric products may be formed, especially if the charge stock contains olefinic hydrocarbons.

Large quantities of aluminum chloride sludges are formed in commercial hydrocarbon isomerization and alkylation processes. Other significant sources of aluminum halide sludges requiring reactivation include the sludges formed in various commercial applications of the Friedel-Crafts reaction, in the condensation of organic compounds to form substances of more complex structure or higher molecular weight, in the synthesis of aldehydes and ketones, and in a variety of miscellaneous reactions known to those familiar with this art. The sludge formed, regardless of its source, is often considered a waste product of the process and is usually disposed of in any convenient manner available, thus presenting a serious disposal problem for the manufacture utilizing aluminum halides as catalysts in a particular process. I have discovered, however, a novel means hereindescribed for regenerating said inactive sludges whereby the aluminum halide compounds contained in the sludge are converted into catalytically active substances containing free aluminum halide suitable for further usage in the process from which the sludge is derived.

It is a primary object of my invention to provide a process for reclaiming the catalytic properties of aluminum halides contained in catalytically inactive sludges formed by contacting an anhydrous aluminum halide with a hydrocarbon reactant for the purpose of converting said hydrocarbon.

Further objects of this invention will become apparent and will be developed in the following further description of the process.

In one embodiment of this invention a deactivated aluminum halide sludge is heated with a normally gaseous olefin-containing hydrocarbon gas under pressure in the presence of metallic aluminum and the resultant product, after removal of the low boiling ends from the residue thereof, is reacted with an anhydrous hydrogen halide to form a reactivated aluminum halide catalyst.

A more specific embodiment of this invention relates to a process for regenerating a deactivated aluminum chloride sludge derived from a hydrocarbon conversion reaction which comprises contacting said sludge with ethylene under pressure in the presence of finely divided aluminum metal, heating the product of the reaction to remove the light hydrocarbon ends therefrom, and contacting the residue thereof with anhydrous hydrogen chloride to form a precipitate containing aluminum chloride and a highly active catalytic material utilizable as a catalyst for said hydrocarbon conversion reaction.

In a still more specific embodiment of this invention, a hydrocarbon-insoluble sludge formed by contacting anhydrous aluminum chloride with olefinic, paraffinic and/or aromatic hydrocarbons at hydrocarbon conversion conditions, is heated with ethylene at a superatmospheric pressure within the range of from about 1 to about 200 atmospheres, at a temperature of from about 50° to about 250° and in the presence of metallic aluminum in an amount (expressed as the ratio of the weight of said aluminum to the weight of said sludge) ranging from about 0.1 to 1 or about 1 to 1, heating the resultant product to vaporize the hydrocarbons therefrom, fractionating the residue and treating resultant fractions thereof containing complex organo-aluminum compounds with anhydrous hydrogen chloride to form a more catalytically active material which is utilizable as catalyst for accomplishing said aforementioned hydrocarbon conversion reaction.

Other embodiments of the invention relate to specific variations of the process conditions, to certain operational procedures involved in accomplishing the defined purpose, and to other factors relating to the process hereinafter more fully described.

According to the present process as expressed in its specific elements above, an inactive aluminum halide sludge recovered from a hydrocarbon conversion process in which said aluminum halide is utilized as catalyst is converted into a more catalytically active form by treating said sludge with ethylene in the presence of metallic aluminum and subsequently reacting the product or certain residual fractions thereof with anhydrous halide, thereby obtaining said reactivated sludge as a product of said treatment. Although purified ethylene is preferred in the initial phase of the reaction, a gaseous mixture containing ethylene may also be utilized to effect a substantially similar reaction. Such gas mixtures, which may be more readily available than purified ethylene, may be obtained, for example, from petroleum refineries as the gaseous product of thermal or catalytic cracking processes. If a gas mixture containing a greater proportion of ethylene therein is desired, the original gas mixture may be treated in a gas concentration unit or a selective solvent absorption treatment to remove the undesired hydrocarbons therefrom. Mixtures containing minor amounts of propylene and/or butylene (say, up to about 10% of the total volume) are also utilizable as such without prior purification and the contamination presents no serious disadvantages. The impurities, however, preferably are not present in the gaseous mixture containing ethylene in amounts greater than the above approximate limitation of 10%. Contamination of the ethylene with saturated hydrocarbons has no pronounced effect on the course of the reaction or the results obtained, since ethylene is the reactive component of the mixture, and the saturated hydrocarbons act merely as diluting components which are recovered practically unaltered.

Although substantially pure ethylene or ethylene-containing gaseous mixtures of 90 or more per cent concentration of ethylene therein are preferred in the present process, other normally gaseous olefins, including propylene, and the normal and isobutylenes may also be employed, preferably with modifications in the method of recovering the product. The olefins above ethylene form higher molecular weight organo-aluminum compounds which, in general, are not as readily recovered by the distillation technique.

The process of the present invention is particularly applicable to the reactivation of aluminum chloride sludges; although, aluminum bromide sludges also respond to the present regenerating treatment with comparable results.

The sludge, as formed in the hydrocarbon conversion process, is, according to all available evidence, a complex addition compound of the aluminum halide catalyst with the hydrocarbons charged into the reaction, particularly the aromatic and unsaturated hydrocarbons such as the mono- and polyolefinic compounds. The sludge may also contain as well, quantities of entrapped hydrocarbons and certain amounts of free aluminum halide, depending upon whether the aluminum halide is completely deactivated or "spent" before removal of the sludge from the system. The chemical nature of the complex aluminum halide-hydrocarbon compounds and their exact chemical structure have not been up to the present completely characterized; however, the complexes are believed to exist in the sludge as loosely bound organic addition compounds of aluminum halide associated with one or more organic radicals. Upon decomposition of the sludge into its hydrocarbon-catalysts components, as for example, by aqueous hydrolysis, the sludge yields hydrocarbons, generally cyclic and unsaturated in structure, formed presumably by complex reaction mechanisms including hydrogen transfer, polymerization and/or cyclization of the hydrocarbons contained in the reaction mixture formed during the conversion. Certain branched chain unsaturated hydrocarbons are also recovered, formed via the exchange of alkyl groups between the hydrocarbons during the conversion reaction as evidence seems to indicate.

In the initial stage of the present process, that is, the ethylene-pressurizing stage, the complex aluminum halide-hydrocarbon addition compounds contained in the sludge are believed to combine with the ethylene and the aluminum also present in the reaction mixture, under the operating conditions specified, to form ethyl- and alkyl-, hydrocarbon-soluble products of the nature of organo-aluminum compounds which may be vaporized, condensed, and recovered as normally liquid products. Analysis of these distillates indicate that they contain alkyl groups and chemically bound aluminum and chlorine atoms, thus indicating a reaction of the materials added to the mixture. In the subsequent stage of this process, wherein anhydrous hydrogen halide is contacted with the product of the initial ethylene pressurizing stage, the hydrogen halide apparently reacts with the above mentioned organo-aluminum compounds to form additional aluminum halide. The final product which precipitates following the addition of hydrogen halide contains free anhydrous aluminum halide and a catalytically active form of the sludge, both of which may be recycled to the initial hydrocarbon conversion process for further usage therein as catalyst to effect said conversion. Aluminum bromide sludges are also subject to reactivation by the present treatment; however, since anhydrous aluminum bromide is quite soluble in hydrocarbons, a substantial portion of the regenerated aluminum bromide produced in the hydrogen bromide treatment may remain dissolved in any liquid or hydrocarbon phase which may be present in the product mixture. Even in such cases where no solid precipitate is formed in the aluminum bromide sludge treatment, the regenerated product is nevertheless catalytically active and may be employed in further hydrocarbon conversion reactions almost as effectively as pure aluminum bromide.

The metallic aluminum employed in the initial ethylene pressurizing stage of this process is desirably in a finely divided form, but said preferred form does not necessarily exclude utilization of larger particles of aluminum in the process. The desirability of finely divided or powdered aluminum is based upon its enhanced reactivity; nevertheless, coarser particles of aluminum may be utilized and the same effect obtained by extending the reaction period to account for the generally lower rate of the reaction obtained in the use of such coarser particles. If the latter are utilized, a greater proportion of metallic aluminum to aluminum halide sludge is usually charged to the reactor to increase thereby the rate of reaction. Concomitant with the use of higher ratios of metallic aluminum to deactivated sludge, the excess unreacted aluminum may be recycled in the process until completely reacted and consumed. The desirability of powdered aluminum over coarser metallic aluminum particles in the ethylene pressurizing stage is in general reflected by the increased rate of reaction obtained by using powdered aluminum. Usually the ratio of the weight of metallic aluminum to aluminum halide sludge desired in the reaction is within the range of from about 1 to 10 to about 1 to 30 for powdered aluminum, whereas the corresponding ratio for granular aluminum (where the size of the granules are of about 1 mm. to about 5 mm. in cross-section) is within the range of from about 1 to 2 to about 1 to 10. The particular size utilized in the reaction zone will depend ultimately upon a variety of other factors as well, including the amount of aluminum halide in the sludge, the contact period of ethylene with the reaction mixture, and the temperature and pressure conditions employed during the process.

In a preferred method of operation, powdered metallic aluminum in which the individual particles range in size from about 5 to about 50 microns, is mixed with the aluminum halide sludge and charged into a stirred autoclave. A gaseous mixture containing ethylene in a concentration greater than about 90% is then introduced into the reactor until a pressure of about 50 to about 200 atmospheres is obtained. The reaction is generally carried out above room temperature in the range of from about 50° to about 250° C., preferably within the range of from about 100° to about 200° C. Temperatures above or below the said preferred range may be utilized and the desired effects obtained thereby, although not as efficiently or as effectively. The latter provision, however, is qualified in that the reaction temperature should be maintained below the point at which the hydrocarbon-aluminum halide complex in the reaction zone will decompose to form appreciable quantities of coke-like material (usually above about 250° C.)

In the initial phase of the present process the reaction is characterized by the formation of a hydrocarbon-soluble liquid reaction product which is usually of a straw-yellow or slightly tan color if a highly colored or tarry sludge is not employed in the process as starting material. The liquid product at room temperature fumes profusely in contact with moist air indicating its volatility and hydroscopicity. No attempt is made in the present specification to define or identify in any conclusive or decisive manner the chemical structure of the compounds formed in the reaction, but merely to indicate generally the observations I have made upon inspection of the various intermediate and final products formed during the operation of the process of this invention.

The organo-aluminum compounds formed in the ethylene pressurizing stage are relatively stable and may be distilled, usually at atmospheric or subatmospheric pressures without decomposition. Although it is not necessarily imperative to distill the product obtained in the aforementioned reaction stage, it is preferably fractionated to recover water-white to straw-yellow colored distillates, since these fractions when treated with anhydrous hydrogen halide according to the subsequent stage of the process, precipitate aluminum halide in a highly desirable catalytically active form, free from polymeric hydrocarbons and tarry materials. The process, however, does not depend upon the distillation treatment or the purification steps for its utility and I do not wish to be limited to a process relying upon the latter additional stages in the treatment of the product. Rather, for the sake of simplicity the organo-aluminum halide product resulting from the ethylene pressurizing stage may be reacted directly with the anhydrous hydrogen halide to recover the final products. The latter operation eliminates the distillation treatment and although the product may contain undesirable foreign materials, it is nevertheless highly active catalytically and may be employed when a less expensive product is desired.

The hydrogen halide utilized in the secondary reaction to precipitate the final product containing the reactivated aluminum halide preferably, although not necessarily, corresponds to the halide of the aluminum complex sludge originally charged and must be anhydrous if the resultant product is to be in a catalytically active anhydrous condition. The secondary reaction may be operated at substantially atmospheric pressure, and the hydrogen halide may be contacted with the primary reaction product by merely bubbling the same into the liquid organo-aluminum halide complex to precipitate the reactivated sludge and/or aluminum halide. The temperature of the reaction is generally maintained at or slightly above room temperature, preferably below 100° C. during the addition of the hydrogen halide to the organo-aluminum complex. Under these conditions the product separates as a mixture of solid aluminum halide and a semi-solid sludge, the purity of the aluminum halide recovered depending upon whether certain select fractions of the organo-aluminum complex or the entire reaction product from the ethylene pressurizing stage is charged to the hydrogen halide treating stage.

The aluminum halide and/or the catalytic sludge precipitated during the said latter stage is separated from the liberated hydrocarbons by filtration, decantation or by any other suitable means and may be transferred directly to the hydrocarbon conversion process or other reaction zone in which the catalyst is to be utilized. If care is exercised to eliminate substantially all the olefinic hydrocarbons from the material treated in this reaction, relatively pure aluminum halide is regenerated in the reaction, free from sludge-like products which form when the aluminum halide is precipitated in the presence of unsaturated hydrocarbons.

The present process is readily adaptable to continuous methods of operation which are especially desirable in commercial processes where the aluminum halide sludge is produced continuously as a by-product of the principal process, usually operated on a continuous basis. The accompanying diagram illustrates the process of the present invention which may be operated continuously by considering each stage of the operation as an individual batch process wherein inactive or spent aluminum halide sludge is intermittently charged through line 1 into primary reaction zone 2 as reactivated sludge product is periodically withdrawn from the process. The spent aluminum halide sludge may be derived from any of the heretofore mentioned sources, but preferably it is obtained from a catalyzed (aluminum chloride or aluminum bromide catalyst) alkylation or isomerization process in which hydrocarbons are converted. Metallic aluminum, preferably in powdered form, is introduced into reaction zone 2 through line 4 simultaneously as aluminum halide sludge is added thereto and thoroughly mixed in said reaction zone by some means of agitation such as by stirring paddles or by circulation through mixing baffles. Ethylene or an ethylene-containing gas is then admitted into reaction zone 2 containing the mixture of reactants heretofore mentioned through line 3 until the desired pressure is obtained, usually a pressure of from about 50 to about 100 atmospheres. The mixture is heated for a period which may range from approximately one-half to two or more hours, depending upon the condition of the sludge, the purity of the ethylene gas and the size of the metallic aluminum particles introduced into said primary reaction zone.

After completion of the reaction, the product is withdrawn from said reaction zone through line 5 and discharged into primary separation zone 6 wherein light hydocarbon gases consisting primarily of unreacted ethylene are vented from said separation zone 6 through line 7. The gas may be utilized for any purpose desired such as consumption for fuel purposes or recycled to primary reaction zone 2 through line 8 connecting with line 3. Excess unreacted aluminum from primary reaction zone 2 usually forms a viscous semi-solid lower layer in primary separation zone 6 and may be removed therefrom by mere decantation or by filtration. Such means for separating the excess unreacted aluminum are not illustrated on the diagram, but said means may be accompanied by additional washing or solvent extraction procedures to remove tars or viscous reaction products therefrom. The separated aluminum is withdrawn from separation zone 6 through line 9 and is either discharged from the process or recycled to primary reaction zone 2 through line 10 connecting with line 4.

The desired clear, mobile product, soluble in the liquid organic products formed in the primary reaction zone is removed from separation zone 6 through line 11 and is either charged into fractionating zone 12 for separation into desired fractions by distillation, or is conducted from line 11, through line 13, which by-pass said fractionating zone 12 and connects with line 14, thus discharging directly into secondary reaction zone 15. As previously indicated, however, in the desired operation of the present process, the product from primary reaction zone 2, that is, the ethylene pressurizing stage is preferably separated into more desirable fractions containing optimum concentrations of the aluminum compounds. Undesired fractions are discharged from fractionating zone 12 through line 16, while the desired organo-aluminum compounds are withdrawn from zone 12 through line 14, which empties into secondary reaction zone 15.

As in primary reaction zone 2, the apparatus employed in secondary reaction zone 15 is preferably a pressure vessel in which anhydrous hydrogen halide introduced through lines 17 and 14 is contacted desirably by mixing with the organoaluminum product separated in fractionating zone 12 or coming directly from zone 6. The conditions maintained during the reaction in zone 15 have heretofore been specified, but in general, the pressure is maintained at or about atmospheric while the temperature therein is held in the neighborhood of room temperature or somewhat less than 100° C.

The products formed in secondary reaction zone 15, some of which are hydrocarbon in character, in admixture with solid or semi-solid aluminum halide, are removed from reaction zone 15 through line 18 into secondary separation zone 19 from which the excess normally non-condensible hydrogen halide is vented through line 20 and recycled to reaction zone 15 through lines 21, 17, and 14. Gaseous and/or liquid hydrocarbons may be vented, decanted, or filtered from the solid or semi-solid reaction products in zone 19 and discharged from said zone through by-product line 22. The desired product comprising regenerated aluminum halide is withdrawn through line 23 into storage or directly into the initial conversion reaction wherein the aluminum halide is employed as catalyst and said sludge is formed.

The operating temperatures and conditions of reaction under which the process of the present invention may be carried out, as well as other details relative to the process, are illustrated by the following examples which are intended merely to be illustrative and not in any way defining the limitations of the invention in accordance to the conditions employed in the examples.

*Example I*

A typical sludge which may be reactivated by the process of this invention is an aluminum chloride isomerization sludge and the reaction by which said sludge is formed is indicated in the following reaction.

1200 cc. of a commercial heptane fraction composed of 50% paraffins and 50% naphthenes having a boiling range of from 90° to 105° C. was contacted with 150 grams of pulverized anhydrous aluminum chloride and 61 grams of anhydrous hydrogen chloride for six hours at 130° C. in a glass-lined rotating autoclave. After the hydrogen chloride and hydrocarbon gases formed in the reaction were vented from the autoclave and the unreacted hydrocarbon layer had been decanted from the reaction product, an aluminum chloride sludge was removed from the reactor amounting to 301 grams. The sludge thus formed contained undissolved crystals and was contacted again with 1200 cc. of commercial heptane at 130° C. in the presence of 30 grams of hydrogen chloride. The sludge separated from the reaction mixture amounted to 316 grams from which a fine gelatinous crystalline mass separated which was removed by filtration. An analysis of the remaining sludge indicated that it contained 9.8% aluminum and 49.0% chlorine.

The heptane fraction sludge produced as above was treated to recover an active aluminum chloride product according to the following procedure: A mixture of 60.1 grams of the sludge and 12.0 grams of granular aluminum metal was placed in a glass liner in a 450 cc. rotating autoclave pressured with 55 atmospheres of ethylene and heated for two hours at 180° C. The products comprised 520 cc. of non-condensible gas (mostly ethylene), 1.3 cc. of condensible (at −78° C.) gas, 8.2 cc. of liquid material recovered from outside of the glass liner, and 97.5 grams of material within the liner. The product in the liner was separated into 39.1 grams of fuming liquid and 58.4 grams of dark, viscous product from which 8.8 grams of aluminum metal was recovered.

Distillation of the decanted liquid gave the following fractions:

| Fraction | Weight, Grams | Boiling Range, ° C. |
|---|---|---|
| 0 | 2.4 | Non-condensible gas. |
| 1 | 3.2 | 50–100 (atmospheric pressure). |
| 2 | 20.2 | Initial—125 (10 mm. pressure). |
| 3 | 6.5 | 125 (10 mm. pressure)—160 (1 mm. pressure). |
| Residue | 4.9 | |
| Loss | 1.9 | |
| Total | 39.1 | |

Fraction 2, when treated with dry hydrogen chloride, yielded a solid (aluminum chloride) and a liquid sludge.

*Example II*

A mixture of 30.1 grams of heptane sludge produced as in Example I and 6.0 grams of granular aluminum metal were placed in a glass liner in a 450 cc. rotating autoclave, pressurized with 52 atmospheres of ethylene, and heated for 2 hours at 180° C. The product comprised 910 cc. of non-condensible gas (mostly ethylene), 3.8 cc. of gas condensible at −78° C., 4.0 cc. of liquid recovered outside the glass liner, and 62.6 grams of material within the liner. The upper clear liquid in the liner, amounting to 52.4 grams, was decanted into a distillation flask and distilled. The lower layer of residue in the liner was treated to recover 3.7 grams of metallic aluminum. Distillation data for the above clear liquid are given in the following table:

| Fraction | Vol., cc. | End boiling point of Fraction, ° C. | Analysis Weight Per Cent Aluminum | Analysis Weight Per Cent Chlorine |
|---|---|---|---|---|
| 0 | 5.1 | Less than 25° C | | |
| 1 | 5.3 | 100 (1 atmos. pressure) | | |
| 2 | 2.4 | Collected in Dry Ice trap at 10 mm. | | |
| 3 | 5.3 | 75 (10 mm.) | 10.6 | 31.8 |
| 4 | 12.2 | 90 (10 mm.) | 17.1 | 48.1 |
| 5 | 5.6 | 112 (10 mm.) | | |
| Residue | 19.0 | | | |
| Total | 54.9 | | | |

Fractions 3, 4 and 5 were separately treated with anhydrous hydrogen chloride, fraction 3 yielding 2.7 grams of solid aluminum chloride, fraction 4 yielding 10.3 grams of a solid mixture of aluminum chloride and sludge and fraction 5 yielding a semi-solid sludge which was largely aluminum chloride.

I claim as my invention:

1. A process for regenerating a substantially deactivated aluminum halide-hydrocarbon sludge formed during a hydrocarbon conversion reaction employing an aluminum halide catalyst, which comprises reacting said sludge with a normally gaseous olefin and metallic aluminum, separating a liquid fraction from the resultant reaction products, subsequently contacting said fraction with anhydrous hydrogen halide, and recovering an active catalyst comprising free aluminum halide.

2. A process for regenerating a substantially deactivated aluminum chloride - hydrocarbon sludge formed during a hydrocarbon conversion reaction employing an aluminum chloride catalyst, which comprises reacting said sludge with ethylene and metallic aluminum, separating a liquid fraction from the resultant reaction products, subsequently contacting said fraction with anhydrous hydrogen chloride, and recovering an active catalyst comprising free aluminum chloride.

3. A process for regenerating a substantially deactivated aluminum bromide - hydrocarbon sludge formed during a hydrocarbon conversion reaction employing an aluminum bromide catalyst, which comprises reacting said sludge with ethylene and metallic aluminum, separating a liquid fraction from the resultant reaction products, subsequently contacting said fraction with anhydrous hydrogen bromide, and recovering an active catalyst comprising free aluminum bromide.

4. The process of claim 1 further characterized in that said metallic aluminum is employed in finely divided form.

5. A process for regenerating a substantially deactivated aluminum halide-hydrocarbon sludge formed during a hydrocarbon conversion reaction employing an aluminum halide catalyst, which comprises reacting said sludge with a normally gaseous olefin and metallic aluminum, the weight ratio of said aluminum to said sludge being from about 1:1 to about 1:30, at a temperature of from about 50° C. to about 250° C. and a pressure of from about 1 to about 200 atmospheres, separating light hydrocarbon gas from the resultant reaction products, fractionating the residual liquid product and separating a light colored distillate substantially free of polymeric and tar-like materials, reacting said distillate with anhydrous hydrogen halide to precipitate an active catalyst comprising free aluminum halide, and recovering said active catalyst.

6. A process for regenerating a substantially deactivated aluminum chloride - hydrocarbon sludge formed during a hydrocarbon conversion reaction employing an aluminum chloride catalyst, which comprises reacting said sludge with ethylene and metallic aluminum, the weight ratio of said aluminum to said sludge being from about 1:1 to about 1:30, at a temperature of from about 50° C. to about 250° C. and a pressure of from about 1 to about 200 atmospheres, separating light hydrocarbon gas from the resultant reaction products, fractionating the residual liquid product and separating a light colored distillate substantially free of polymeric and tar-like materials, reacting said distillate with anhydrous hydrogen chloride to precipitate an active catalyst comprising free aluminum chloride, and recovering said active catalyst.

7. A process for regenerating a substantially deactivated aluminum halide - hydrocarbon sludge formed during a hydrocarbon conversion reaction employing an aluminum halide catalyst, which comprises reacting said sludge with a normally gaseous olefin and metallic aluminum to form normally liquid organo-aluminum compounds, separating the latter and reacting the same with anhydrous hydrogen halide to precipitate a catalytically active material comprising free aluminum halide, and recovering said catalytically active material.

8. A process for regenerating a substantially deactivated aluminum chloride - hydrocarbon sludge formed during a hydrocarbon conversion reaction employing an aluminum chloride catalyst, which comprises reacting said sludge with ethylene and metallic aluminum to form normally liquid organo-aluminum compounds, separating the latter and reacting the same with anhydrous hydrogen chloride to precipitate a catalytically active material comprising free aluminum chloride, and recovering said catalytically active material.

JULIAN M. MAVITY.

REFERENCES CITED

The following references are of record in the file of this patent:

UNITED STATES PATENTS

| Number | Name | Date |
|---|---|---|
| 1,745,028 | Ricard | Jan. 28, 1930 |
| 1,877,664 | Howes | Sept. 13, 1932 |
| 2,168,271 | Perquin | Aug. 1, 1939 |
| 2,348,408 | Page | May 9, 1944 |
| 2,388,428 | Mavity | Nov. 6, 1945 |
| 2,398,869 | Thiele | Apr. 23, 1946 |